US012625917B2

(12) United States Patent
Naserian et al.

(10) Patent No.: US 12,625,917 B2
(45) Date of Patent: May 12, 2026

(54) CLOUD-BASED APPLICATION PLATFORM TO SEARCH AND RETRIEVE EVIDENCE RECORDS RELATED TO A VEHICULAR EVENTS

(71) Applicant: GM GLOBAL TECHNOLOGY OPERATIONS LLC, Detroit, MI (US)

(72) Inventors: Mohammad Naserian, Windsor (CA); Patrick Giancarlo Gabriel DiGioacchino, Niagara Falls (CA); Utkarsh Saini, Pickering (CA); Daniel Xie, Markham (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/939,730

(22) Filed: Nov. 7, 2024

(65) Prior Publication Data

US 2026/0127234 A1     May 7, 2026

(51) Int. Cl.
| | |
|---|---|
| *G06F 16/9538* | (2019.01) |
| *G06F 16/9535* | (2019.01) |
| *G06Q 40/08* | (2012.01) |

(52) U.S. Cl.
CPC ...... *G06F 16/9538* (2019.01); *G06F 16/9535* (2019.01); *G06Q 40/08* (2013.01)

(58) Field of Classification Search
CPC .......... G06F 16/9538; G06F 16/95335; G06Q 40/08
See application file for complete search history.

(56) References Cited

U.S. PATENT DOCUMENTS

| | | | |
|---|---|---|---|
| 8,024,330 B1 * | 9/2011 | Franco .................. | H04W 4/029 |
| | | | 707/724 |
| 9,406,336 B2 * | 8/2016 | Bose ....................... | A63F 13/00 |

(Continued)

FOREIGN PATENT DOCUMENTS

| | | |
|---|---|---|
| DE | 102016112908 A1 | 1/2017 |
| DE | 102017000727 A1 | 7/2017 |

(Continued)

OTHER PUBLICATIONS

C. P. Young, B. R. Chang and T.-Y. Wei, "Highway vehicle accident reconstruction using Cooperative Collision Warning based Motor Vehicle Event Data Recorder," 2009 IEEE Intelligent Vehicles Symposium, Xi'an, China, 2009, pp. 1131-1136, doi: 10.1109/IVS. 2009.5164441. (Year: 2009).

(Continued)

*Primary Examiner* — Mark E Hershley
(74) *Attorney, Agent, or Firm* — Ingrassia Fisher & Lorenz, LLP | IF&L

(57) ABSTRACT

A method and system for collecting, matching and reporting evidence related to a collision event captured on a first collision detection device associated with a vehicular transportation system. A first incident report of the collision event communicated from the first collision detection device to the cloud-based application. The first incident report includes image data, location data, and temporal data of the collision event. A collision event database of the cloud-based application is searched to locate a second incident report of the collision event. The first incident report is compiled with the second incident report when the collision event of the first incident report matches the recorded collision event of the second incident report. A collision evidence report is generated based on the compiled first and second incident reports.

20 Claims, 5 Drawing Sheets

(56) References Cited

U.S. PATENT DOCUMENTS

| | | | | |
|---|---|---|---|---|
| 9,619,891 | B2 * | 4/2017 | Bose | A63F 13/65 |
| 9,866,673 | B2 * | 1/2018 | Gabel | H04W 4/16 |
| 9,947,215 | B2 * | 4/2018 | Di Censo | G08G 1/005 |
| 10,032,226 | B1 * | 7/2018 | Suizzo | G06Q 10/10 |
| 10,324,463 | B1 * | 6/2019 | Konrardy | G01S 19/39 |
| 10,360,601 | B1 * | 7/2019 | Adegan | G06Q 30/0283 |
| 10,373,259 | B1 * | 8/2019 | Konrardy | G06Q 40/08 |
| 10,387,962 | B1 * | 8/2019 | Potter | G08B 25/00 |
| 10,395,332 | B1 * | 8/2019 | Konrardy | G01S 5/0027 |
| 10,504,302 | B1 * | 12/2019 | Chavez | H04W 4/90 |
| 10,848,913 | B2 * | 11/2020 | Pal | G07C 5/008 |
| 10,861,320 | B2 * | 12/2020 | Martin | H04W 4/02 |
| 11,352,034 | B2 * | 6/2022 | Ross | B60W 30/09 |
| 11,669,090 | B2 * | 6/2023 | Konrardy | G05D 1/617 |
| | | | | 701/23 |
| 11,820,320 | B2 * | 11/2023 | Yang | B60R 21/01552 |
| 11,868,599 | B2 * | 1/2024 | Conlon | G06Q 50/265 |
| 11,949,807 | B1 * | 4/2024 | Jackson | G07C 5/008 |
| 11,990,160 | B2 * | 5/2024 | Bose | G06T 7/20 |
| 12,175,578 | B1 * | 12/2024 | Campbell | G06T 13/00 |
| 12,397,785 | B1 * | 8/2025 | Hines | B60W 30/0953 |
| 12,459,459 | B2 * | 11/2025 | Wang | B60R 21/01512 |
| 2003/0023476 | A1 * | 1/2003 | Gainey | G06Q 10/10 |
| | | | | 705/7.42 |
| 2006/0269104 | A1 * | 11/2006 | Ciolli | G08G 1/052 |
| | | | | 382/104 |
| 2007/0087756 | A1 * | 4/2007 | Hoffberg | G06Q 10/06375 |
| | | | | 455/450 |
| 2011/0016377 | A1 * | 1/2011 | Caldwell | G06Q 10/10 |
| | | | | 715/205 |
| 2015/0356793 | A1 * | 12/2015 | Dietz | B60R 25/30 |
| | | | | 701/1 |
| 2016/0036899 | A1 * | 2/2016 | Moody | H04L 67/141 |
| | | | | 709/217 |
| 2016/0286156 | A1 * | 9/2016 | Kovac | H04N 5/772 |
| 2016/0294493 | A2 * | 10/2016 | Daoura | H04W 4/06 |
| 2017/0025007 | A1 * | 1/2017 | Hyde | G08G 1/166 |
| 2017/0300503 | A1 | 10/2017 | Wang et al. | |
| 2019/0043351 | A1 * | 2/2019 | Yang | G06V 10/764 |
| 2022/0303765 | A1 * | 9/2022 | Zhou | H04L 9/3073 |
| 2022/0366368 | A1 * | 11/2022 | Simpson | H04L 9/50 |
| 2023/0098246 | A1 * | 3/2023 | Simpson | G01C 21/3407 |
| | | | | 707/703 |
| 2023/0252889 | A1 * | 8/2023 | Lepp | G08G 1/205 |
| | | | | 701/117 |
| 2023/0260049 | A1 * | 8/2023 | Brandmaier | G08G 1/205 |
| | | | | 280/729 |
| 2023/0351298 | A1 * | 11/2023 | Freis | G06Q 10/0635 |
| 2024/0193367 | A1 * | 6/2024 | Juneja | G06F 18/22 |
| 2024/0331817 | A1 | 10/2024 | Lane et al. | |

FOREIGN PATENT DOCUMENTS

| | | | | |
|---|---|---|---|---|
| DE | 102018111780 A1 | 11/2018 | | |
| DE | 102018210211 A1 * | 12/2019 | | G07C 5/008 |
| EP | 1271448 A1 | 1/2003 | | |
| WO | WO-2023235251 A1 * | 12/2023 | | B60R 21/01332 |

OTHER PUBLICATIONS

S. U. Rahman and U. Hengartner, "Secure crash reporting in vehicular Ad hoc networks," 2007 Third International Conference on Security and Privacy in Communications Networks and the Workshops—SecureComm 2007, Nice, France, 2007, pp. 443-452, doi: 10.1109/SECCOM.2007.4550365. (Year: 2007).

V. Dankan Gowda, et al, "Design and Implementation of a System for Vehicle Accident Reporting and Tracking," 2022 7th International Conference on Communication and Electronics Systems (ICCES), Coimbatore, India, 2022, pp. 349-353, doi: 10.1109/ICCES54183.2022.9835896. (Year: 2022).

* cited by examiner

300

302

304

306

308

310

CLOUD-BASED APPLICATION PLATFORM TO SEARCH AND RETRIEVE EVIDENCE RECORDS RELATED TO A VEHICULAR EVENTS

INTRODUCTION

The technical field generally relates to gathering evidence of vehicular event, and more particularly relates to a system and method for collecting, matching and reporting evidence related to a vehicular collision event captured on a first collision detection device associated with a vehicular transportation system.

In recent years, advancements in vehicular safety technologies have increasingly focused on improving the ability of vehicles to prevent and mitigate collisions. One significant area of development is in vehicular communication protocols, which allow vehicles to exchange critical information in real time. These systems are designed to enhance situational awareness, enabling vehicles to react to potential hazards before they become imminent threats. A primary use case for these communication protocols is the transmission of vehicle data to cloud-based applications, hosted on a remote server.

In the event of a minor collision event, drivers of vehicles involved in a multi-vehicle collision event may not find it desirable to pull over and share collision event information. For varied reasons, the driver may not feel as if the environment associated with the collision event is safe. Likewise, the driver may not consider the minor collision serious enough to stop and provide information regarding the collision event.

The present disclosure addresses the above-mentioned issues and more.

SUMMARY

In one aspect the present disclosure provides a method for collecting, matching and reporting evidence related to a collision event involving a vehicle and an object captured on a first collision detection device associated with a vehicular transportation system. The method includes establishing a communication link between a cloud-based application and a first collision detection device. The first collision detection device is registered with the cloud-based application for communication therewith. The method includes receiving a first incident report of the collision event communicated from the first collision detection device to the cloud-based application. The first incident report includes image data, location data, and temporal data of the collision event. The method includes searching a collision event database of the cloud-based application having a plurality of stored incident reports to locate a second incident report of the collision event. Each of the plurality of stored incident reports includes image data, location data, and temporal data of a recorded collision event. The method includes compiling the first incident report with the second incident report when the collision event of the first incident report matches the recorded collision event of the second incident report and generating a collision evidence report based on the compiled first and second incident reports.

In one form, the method includes comprising storing the first incident report and the collision evidence report to the collision event database.

In some forms, the first incident report is received from a device involved in the first collision event.

In at least one form, the first incident report is received from an observing device in proximity to the first collision event.

In yet another form, the first incident report is received from a vehicle in proximity to the first collision event.

In some forms, the first incident report is received from an infrastructure device associated with vehicular transportation system and in proximity of the first collision event.

In still another form, the method further includes processing the collision evidence report to identify the vehicle involved in the collision event, searching the cloud-based application to determine whether the vehicle is registered for communication therewith, establishing a communication link with the vehicle when registered for communication with the cloud-based application, and transmitting the collaborated evidence report to the vehicle.

In yet another form, the method includes receiving a search query from a registered user on the cloud-based application. The search query includes a geographic location and a temporal window. The method also includes searching the collision event database for identifying the collision event based on the search query, and transmitting the collaborated evidence report to the registered user.

In one form, the method further includes registering a user having a user device with the cloud-based application, granting a permission right to the user for communicating with the cloud-based application via the user device. The cloud-based application receives time and location data of user device. The method further includes setting a user preference to push notifications from the cloud-based application to the user based. The user preference includes a device location range and a device time window for pushing notifications. The method also includes generating a registration record for the user including an identification of the user and the user device, the permission right and the user preference.

In another form, the method further includes processing the first incident report to determine a collision time and a collision location for the collision event, locating the user device based on the time and location data received therefrom, and transmitting a notification for the collision event when the user device is proximate to the collision event based on the device location range and the device time window.

In another aspect, the present disclosure provides a cloud-based application system for collecting, matching and reporting evidence related to collision events within a vehicular transportation system. The cloud-based application is hosted on a remote server and includes a collision event database, a communication module, and an evidence matching module. The collision event database stores a plurality of incident reports. Each incident report is associated with a recorded collision event that occurred between a vehicle and an object and includes image data, location data, and temporal data of the recorded collision event. The communication module establishes a communication link between the cloud-based application and a first collision detection device. The first collision detection device is registered with the cloud-based application for communication therewith. The evidence matching module having a processing unit. The processing unit receives a first incident report of a first collision event communicated from the first collision detection device to the cloud-based application. The first incident report includes image data, location data, and temporal data of the first collision event. The processing unit also searches the collision event database to locate a second incident report for the first collision event, compiles the first incident report with the second incident report when the first collision event of the first incident report matches the recorded collision event of the second incident report; and generates a collision evidence report based on the compiled first and second incident reports.

In one form, the processing unit of the evidence matching module stores the first incident report and the collision evidence report to the collision event database.

In another form, the communication module is further configured to receive the first incident report from a device involved in the first collision event.

In some forms, the communication module receives the first incident report from an observing device in proximity to the first collision event.

In at least one form, the communication module receives the first incident report from a vehicle in proximity to the first collision event.

In yet another form, the communication module receives the first incident report from an infrastructure device associated with vehicular transportation system and in proximity of the first collision event.

In still another form, the processing unit of the evidence matching module processes the collision evidence report to identify the vehicle involved in the collision event, searches the cloud-based application to determine whether the vehicle is registered for communication therewith, establishes a communication link with the vehicle when registered for communication with the cloud-based application, and transmits the collaborated evidence report to the vehicle.

In yet another form, the processing unit of the evidence matching module receives a search query from a registered user on the cloud-based application. The search query includes a geographic location and a temporal window. In this form, the processing unit of the evidence matching module also searches the collision event database for identifying the collision event based on the search query and transmits the collaborated evidence report to the registered user.

In some forms, the processing unit of the evidence matching module registers a user having a user device with the cloud-based application and grants a permission right to the user for communicating with the cloud-based application via the user device. The cloud-based application receives time and location data of user device. The processing unit of the evidence matching module also sets a user preference to push notifications from the cloud-based application to the user based. The user preference includes a device location range and a device time window for pushing notifications. The processing unit of the evidence matching module also generates a registration record for the user including an identification of the user and the user device, the permission right and the user preference.

In some forms, the processing unit of the evidence matching module processes the first incident report to determine a collision time and a collision location for the collision event, locates the user device based on the time and location data received therefrom, and transmit a notification for the collision event when the user device is proximate to the collision event based on the device location range and the device time window.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Additional information related to the subject matter described and claimed herein are provided in following related applications which are filed by Applicant of even date herewith: System And Method For Collision Matching And Information Exchange (application Ser. No. 18/939, 670); Information Gathering and Sharing From A Collision Event (application Ser. No. 18/939,722); and System and Method for Documenting Vehicular Events (application Ser. No. 18/939,691). The entire disclosures of each of the above applications are incorporated herein by reference.

Figure 1:
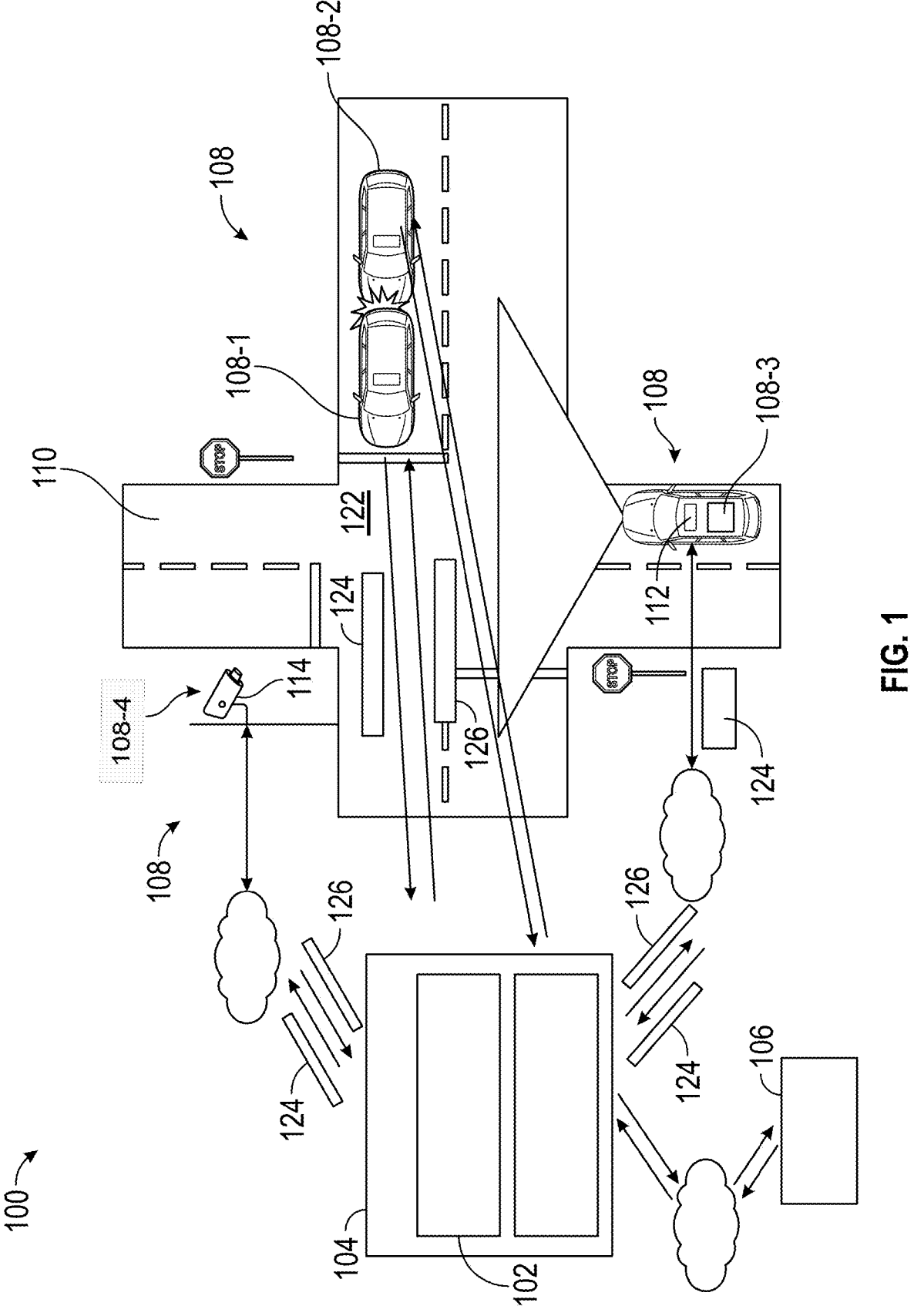
FIG. 1 is an illustrative diagram showing the contextual environment of a system in accordance with the present disclosure.

Referring to FIG. 1, the present disclosure illustrates a vehicular transportation system environment including a system 100 for collecting, searching, matching and/or reporting evidence related to collision that includes, an evidence collecting application 102 stored on a remote server 104 in communication with a user terminal 106 and a plurality of collision detection devices 108 that are located about an intersection 112 of a road 110. While the environment of the collision detection devices 108 is positioned near or about the intersection 112, the environment of the collision detection devices 108 can include any location where a collision event occurs between a plurality of objects such as vehicles 108-1, 108-2. A collision detection device 108 can be located within a vehicle, a mobile computing device, a vehicle roadside infrastructure device, a traffic camera device, or the like. The evidence collecting application 102 compiles one or more incident reports 124 received from the collision detection devices 108 when the evidence collected in the incident reports 124 match collision event, and generates a collision evidence report 126 based on evidence from the matched incident reports 124.

Each collision detection device 108 may capture a collision event between involved objects such as vehicles 108-1, 108-2. In one form, the collision detection devices 108 are each registered as a member with the evidence collecting application 102. As a member associated with the evidence collecting application 102, the collision detection devices 108 have permission granted to communicate with the evidence collecting application 102 for uploading an incident report 124 generated from evidence collected during a collision event detected by a collision detection device 108. The incident report 124 includes a location of the collision event, a time frame or temporal window of the collision event, image data capturing the collision event, and identity information related to collision event. Each collision detection device 108 enables broadcasting of messages to the evidence collecting application 102 as well as other collision detection devices 108 within a predetermined range. The collision detection device 108 transmits or broadcasts, messages (e.g., data packets containing messages or data) using a dedicated communication protocol, such as a dedicated short-range communication (DSRC), a vehicle-to-vehicle (V2V) communication system, a Cellular Vehicle-to-Every-thing (C-V2X), Vehicle-to-Infrastructure (V2I), Vehicle-to-People (V2P), 5GLTE cellular communication, Vehicle-to-Everything (V2X) or the like. Using this communication broadcast protocol, each collision detection device 108 can transmit at low latency to ensure that the evidence collecting application 102 and other collision detection devices 108 within range can quickly receive and process data from the collision detection device 108 that broadcasted at low latency. The collision detection device 108 also manages incoming and outgoing data transmission for its respective communication network and employs asymmetric encryption to secure broadcast messages transmitted or exchanged between the respective collision detection device 108 and the evidence collecting application 102.

The collision detection device 108 initiates an input request to a user of a respective collision detection device 108 to determine if transmission of a respective incident report 124 is desired. The collision detection device 108 determines whether to transmit an incident report 124 when a user preference is set to "YES" indicating that transmission the respective incident report is desired. The collision detection devices 108 determine not to transmit an incident report 124 based on the user preference being set to "NO" indicating that transmission of the respective incident report 124 is not desired.

Each collision detection device 108 includes a location system (not shown) such as a global positioning system (GPS), a global navigation system, or a similar satellite navigation system. The location system may be configured to generate location data for the collision detection device 108, such as via a transceiver communicating with one or more satellites orbiting the Earth. The location data may include a current geographic location of each collision detection device 108, such as longitude and latitude coordinates of the collision detection device. Using the longitude and latitude coordinates, each collision detection device 108 determines a location associated with a collision event between the involved vehicles 114-1, 114-2 observed with the respective collision detection device 108.

The collision detection devices 108 may be enabled as a mobile device (not shown) associated with a vehicle, such as a vehicle 108-1, 108-2 involved in the collision event. Alternately, each collision detection device 108 may be enabled as a mobile, observer device associated with a vehicle, such as a vehicle 108-3 not involved in the collision event. Each collision detection device 108 may also be enabled as a stationary device 108-4 associated with a roadside infrastructure device, such as a traffic camera device, a connected vehicle roadside device (not shown). Regardless of the embodiment of the device as a mobile device or a stationary device are positioned about an intersection 112 of the road 110 as shown in FIG. 1. Each collision detection device 108 is configured to acquire data of a collision event between the first vehicle 108-1 and the second vehicle 108-2 and transmit an incident report 124 with the data to the evidence collecting application 102.

A plurality of collision detection devices 108 may individually and collectively detect a collision event along the road 110. For example, the first vehicle 108-1 may detect a first collision event with the second vehicle 108-2, generate a first incident report 124-1 based on the first collision event detected, and transmit the first incident report 124-2 to the evidence collecting application 102. Likewise, the second vehicle 108-2 may detect a second collision event with the first vehicle 108-1, generate a second incident report 124-2 based on detecting the second collision event and transmit the second incident report 124-2 to the evidence collecting application.

The first vehicle 108-1 and the second vehicle 108-2 may be a conventional, autonomous or semi-autonomous vehicle in communication with the evidence collecting application 102. In some embodiments, the first vehicle 108-1 and the second vehicle 108-2 may include an automobile, a motorcycle, or a truck. In this example, the first vehicle 108-1 is a passenger vehicle. The first vehicle 108-1 and the second vehicle 108-2 include a plurality of components and subsystems distributed within the respective vehicle 108-1, 108-2 to work together to perform one or more functions to achieve particular objectives related to the respective vehicle 108-1, 108-2 operation, safety, comfort and/or efficiency. These systems can be mechanical, electrical, electronic, hydraulic or a combination of these are designed to ensure that the first vehicle 108-1 operates and performs effectively under one or more conditions. Each of the first and second vehicles 108-1, 108-2, individually and/or collectively, may detect a collision event and generate the incident report based on detecting the collision event.

The mobile observing devices 108-3 and the stationary observing devices 108-4, which are uninvolved in a collision event, detect the collision event, then generate and transmit an incident report 124 to the evidence collecting application. The mobile observing device 108-3 may be a conventional, autonomous or semi-autonomous vehicle in communication with the evidence collecting application 102. In some embodiments, the mobile observing device 108-3 may include an automobile, a motorcycle, or a truck. In this example, the mobile observing device 108-3 is a passenger vehicle, and includes a plurality of components and subsystems distributed the third-party vehicle 108-3 to work together to perform one or more functions to achieve particular objectives related to the within the third-party vehicle 108-3 operation, safety, comfort and/or efficiency. These systems can be mechanical, electrical, electronic, hydraulic or a combination of these are designed to ensure that the third-party vehicle 108-3 operates and performs effectively under one or more conditions.

The evidence collecting application 102 is a cloud-based application that provides a cloud service over a network, such as the Internet or a cellular network. The cloud-based application may in hosted by one or more remote servers or computers to process the information exchanged between the evidence collecting application 102 and the collision detection devices 108 off-site remote from the collision detection devices 108.

Figure 2:
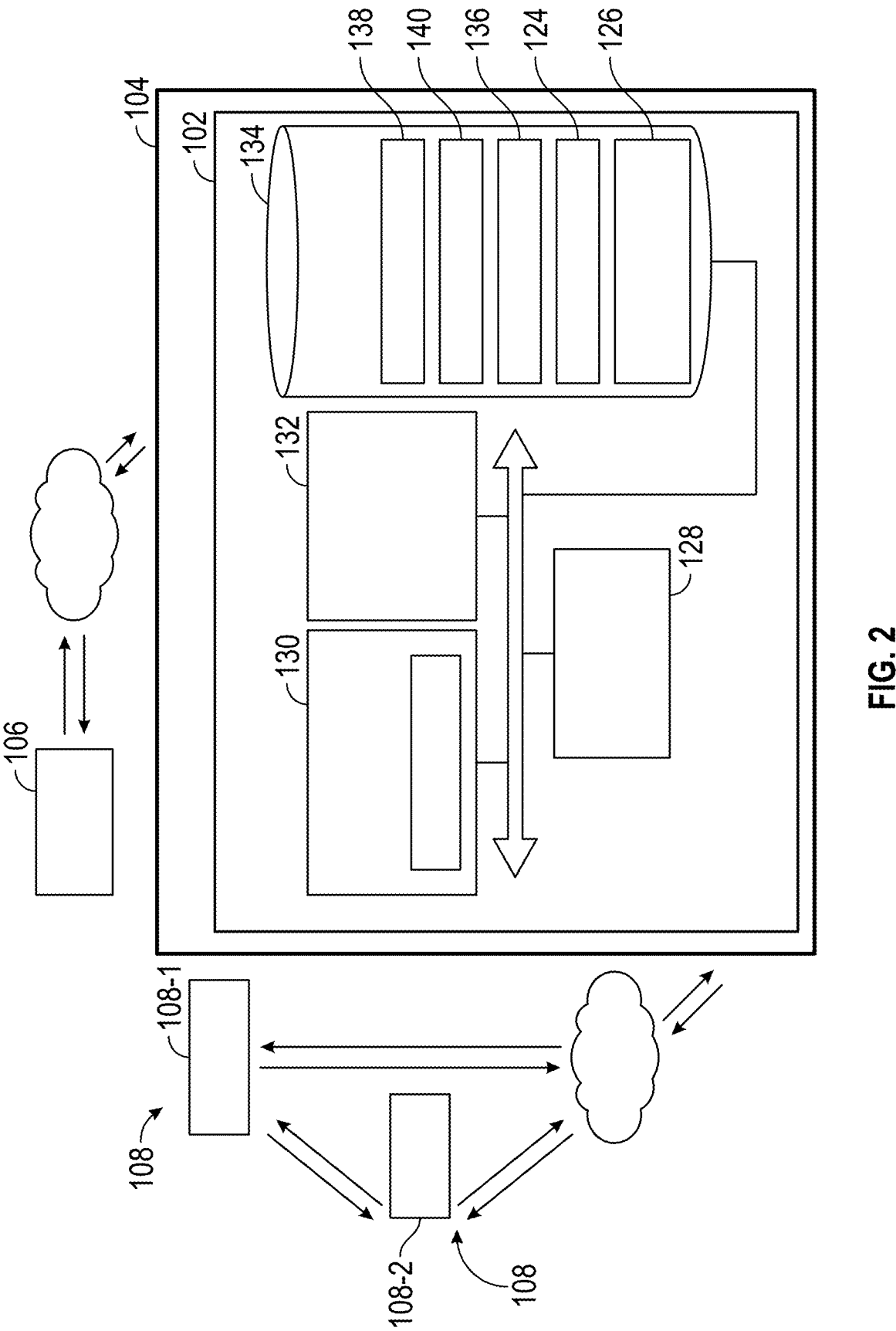
FIG. 2 is a block diagram of a remote server hosting an application for collecting, matching and reporting evidence related to collision events within a vehicular transportation system in accordance with the present disclosure.

Referring again to FIG. 2, the evidence collecting application 102 includes a registration module 128, an evidence matching module 130, a communication module 132, and a collision event database 134. The registration module 128 prompts a user, via the user terminal 106, to enter registration information for associating a collision detection device 108 with the evidence collecting application 102. The registration information includes a user's name, address and mobile number. The registration information may include other types of information depending on the collision detection device 108 that is being registered.

In one form, if the collision detection device 108 is a vehicle 108-1, 108-2, 108-3, the registration information may include a username, a vehicle information, an insurance policy record, and a driver's license information related to the vehicle 108-1, 108-2, 108-3 being registered. The vehicle information may also include data related to VIN number, vehicle make, vehicle, and vehicle color. The insurance policy record includes an insurance policy name, an insurance policy number, and a name of a driver insurance. The driver's license information includes a driver's name, a driver's address, a driver's license number, and a driver's license expiration date. In another form, if the collision detection device 108 is the infrastructure device 108-4, the registration information includes a device identification number, and a device location.

The registration module 128 prompts the user to input one or more user preferences to customize a user's experience with the evidence collecting application 102. The registration module 128 prompts the user, via the user terminal 106, to input a first user preference indicating if the user would like to automatically upload an incident report after the collision detection device 108 detects a collision event. The registration module 128 prompts the user, via the user terminal 106 to input a second user preference indicating whether to notify the user via the user terminal notification to view collisions recorded in a vicinity of the collision detection device 108. The vicinity of the collision detection device 108 includes a predetermined range proximate to the collision detection device 108. The registration module 128 prompts the user, via the user terminal 106, to input a third user preference indicating whether the evidence collecting application may track the location of the collision detection device 108. Based on the registration information and the user preferences, the registration module 128 creates and stores a user record 136, to the collision event database 134, associated with the user and the collision detection device 108 being registered.

The evidence matching module 130 receives an incident report from a respective collision detection device 108 and stores the incident report within the collision event database 134. The evidence matching module 130 determines whether the collision detection device 108 sending the incident report 124 is registered with the evidence collecting application 102.

The evidence matching module 130 further determines whether any of involved vehicles 108-1, 108-2 providing the incident report 124 is registered as members with the evidence collecting application 102. In one example, the evidence matching module 130 determines that the affected vehicles are registered with the evidence collecting application based on the registration information stored in the collision event database 134. The evidence matching module 130 transmits a notification to an involved vehicle 108-1, 108-2 that is registered with the evidence collecting application 102 as a member or to the user terminal 106 associated with a registered member. The notification prompts the user to evaluate collisions reported in proximity with an involved vehicle 108-1, 108-2. In one form, the evidence matching module 130 determines a location of the collision event and broadcasts a notification to all collision detection devices of users, having a user record associated with the evidence collecting application 102, that are located within a predetermined range of the collision event and the location of the respective evidence collecting application.

In one form, the evidence matching module 130 determines that the collision detection device 108 that sent the incident report 124 is not registered with the evidence collecting application 102. The evidence matching module 130 prompts the user via a human machine interface (not shown) associated with the respective evidence matching module 130 to determine whether the user desires to register the involved vehicle 108-1, 108-2 with the evidence collecting application 102. In this example, if the user desires to register the collision detection device 108, the evidence collecting application 102 registers the respective collision detection device 108 with the evidence collecting application 102 as stated above. In some forms, if the user does not desire to register with the evidence collecting application 102, the evidence matching module 130 saves the incident report 124 within the collision event database 134. In another example, the evidence matching module 130 disregards the incident report 124.

In one form, the evidence matching module 130 analyzes the image data of the incident report 124 to determine whether a current size, color and/or format of the image data conforms to a predetermined image model. The evidence matching module 130 processes the image data of the incident report 124 to conform the image data to a desired size, color, format, or a combination thereof of the predetermined image model. For example, the evidence matching module 130 formats, compresses, crops, white balances or a combination thereof to manipulate the image data to the desired size, color and/or format for storing in the collision event database 134.

In another example, the evidence matching module 130 analyzes the image data to determine whether the image data includes metadata based on a metadata model. The metadata model identifies a list of collision related data identifiers for each image data stored within the collision event database 134. For example, the list of collision related data identifiers includes a collision event, a location of the collision event, a temporal window of the collision event, identification of an involved vehicle 108-1, 108-2, and/or the like. In analyzing the image data, the evidence matching module 130 utilizes any number of image processing techniques for identifying and extracting metadata associated with the image data known to one of ordinary skill in the art to search the image data and locate metadata associated within the image data. In one form, the evidence matching module 130 determines that the image data of the incident report includes the metadata based on the metadata model and stores the image data and the incident report. The evidence matching module 130 determines that the image data omits a portion, or all of the metadata based on the metadata model and generates the image metadata based on the metadata model and the incident report. Once generated, the evidence matching module 130 inserts the image metadata into the image data of the incident report creating a processed image data and stores the processed image data with the incident report in the collision event database 134.

The evidence matching module 130 determines whether any other incident reports 124 were received from other collision detection devices 108 regarding the same collision event that is associated with the incident report 124. The other incident reports 124 maybe previously stored in the collision event database 134. In one example, the evidence matching module 130 searches the collision event database 134 to locate previously stored incident reports 124 based on the temporal window and location of the collision event associated with a received incident report. When a previously stored incident report is identified with the collision event, the evidence collecting module compiles the received incident report 124 to the previously stored incident report 124 and generates a collision evidence report. The collision evidence report 126 includes a number of vehicles identified in collision event, identification of the collision detection device 108 that transmitted the incident report, location of the collision event detected, a number of vehicles detected, descriptive data of each involved vehicle 108-1, 108-2, the image data and/or the like associated the collision event from each incident report 124 received. The collision evidence report 126 may also include insurance policy record, driver license information, vehicle registration information, and the like for the first vehicle 108-1, the second vehicle 108-2, or a combination thereof. This information may be extracted from an incident report originating from an involved vehicle 108-1, 108-2, or may be retrieved from the registration record of a registered user in the evidence collecting application 102. In one embodiment, the evidence matching module 130 receives a search query, from the user terminal 106 or the collision detection device 108, for a collision evidence report 126 associated with a predetermined search criterion. The search criterion includes search terms such as a word or phrase entered into a search engine (not shown) of the evidence collecting application 102. For example, the search criterion includes a location of the collision event, a temporal window of the collision event, trip history within a predetermined time frame of the temporal window of the collision event, and image data capturing the collision event.

In one form, the evidence matching module 130 determines whether to restrict access to data related to a collision evidence report 126 being requested via the search query based on the search query being associated with a collision detection device 108 that is registered with the evidence collecting application 102. In one example, the evidence matching module 130 determines that the search query is associated with a collision detection device 108 that is registered with the evidence collecting application 102 and allows full access to the collision evidence report 126 being requested by the search query. In one form, the evidence matching module 130 allows access to stored collision evidence reports 126 to all collision detection devices 108 that are registered with the evidence collecting application 102. In another example, the evidence matching module 130 restricts or inhibits a portion or full access to the collision evidence report 126 being requested by the search query when the search query is not associated with a collision detection device 108 that is a registered with the evidence collecting application 102. In one form, the evidence matching module 130 inhibits access to all stored collision evidence reports 126 based on the search query being associated with a collision detection device 108 not registered. In other words, the evidence matching module 130 may limit access to data (i.e., less than full access) of the requested collision evidence report 126 to the public or non-members of the evidence collecting application 102. Limited access data of the collision evidence report 126 includes, but not limited to, a location and time of the collision event detected, and a number of vehicles detected at the collision event and/or descriptive data related to each involved vehicle 114-1, 114-2.

In addition to restricting access to the collision evidence report 126, the evidence matching module 130 prompts the user, via the user terminal 106, to register a collision detection device 108 associated with the search query in one form. The evidence matching module 130 determines whether the user has registered a collision detection device 108 with the evidence collecting application 102 in response to being prompted to register a collision detection device 108 to conduct the search query. The evidence matching module determines that a collision detection device 108 has registered to the evidence collecting application 102 and retrieves and displays the collision evidence report 126 requested based on the search query. The evidence matching module 130 determines that the user declines to register a collision detection device 108 and, in response, either restricts a portion or all access to the collision evidence report 126 being requested. For example, instead of displaying all of the collision evidence report to the user, via the user terminal 106, the evidence matching module 130 displays limited data from the collision evidence report 126, such as a collision event and a location of the collision event.

In another example, the evidence matching module 130 determines whether to allow full access or restricted access to data of the collision evidence report 126 based on a user profile being associated with an involved vehicle or a trip history of a respective collision detection device 108. In one form, the evidence matching module 130 determines whether the user profile initiating the search query is associated with a collision detection device 108 that is an involved vehicle 108-1, 108-2. For example, the evidence matching module identifies an involved vehicle 108-1, 108-2 based on the collision evidence report 126 retrieved based on the search query. The evidence matching module compares the involved vehicle 108-1, 108-2 to the collision detection device 108 associated with the search query. The evidence matching module 130 determines that the collision detection device 108 associated with the search query matches the involved vehicle 108-1, 108-2, and, in response, retrieves and displays a collision evidence report 126 requested via the search query. The evidence matching module 130 determines that the collision detection device 108 associated with the search query does not match with the involved vehicle 108-1, 108-2 and, in response, restricts a portion or all of the collision evidence report 126 being requested. A restricted portion of the collision evidence report 126 could include, but is not limited to, a location and time of the collision event detected, and a number of vehicles detected descriptive data of each collision affected vehicle 108 in one form.

In another form, the evidence matching module 130 determines whether to restrict access to a respective collision evidence report 126 being requested, in response to a search query initiated by a user, based on a trip history associated with a respective collision detection device 108 registered by the user. In one example, the evidence matching module 130 determines whether a location of the collision detection device 108 is within a predetermined range of the collision event. The evidence matching module 130 receives the trip history of the collision detection device 108 that is associated with the search query. The evidence matching module 130 analyzes the collision evidence report to determine a location and the temporal window of the collision event. The evidence matching module 130 determines a location of the collision detection device 108 during the time frame of the collision event based on the temporal window of the collision event. The evidence matching module 130 determines whether the location of the collision detection device 108 was within the predetermined range of the location and within the temporal window of the collision event.

The evidence matching module 130 determines to restrict access to the respective collision evidence report 126, when the location of the respective collision detection device 108 was not within the predetermined range and the temporal window of the collision event associated for the respective collision evidence report 126 being requested. The evidence matching module 130 determines to grant full access to the respective collision evidence report 126 when the location the respective collision detection device 108 was within the predetermined range and the temporal window of the collision event associated with the respective evidence collision evidence report 126 being requested.

The communication module 132 receives a request for a communication link from requesting collision detection device 108. Once the communication link is established, the communication module 132 receives an incident report 124 from the collision detection device 108. The communication module 132 establishes communication with the collision detection device 108 and the user terminal 106 via any communication method to exchange messages (e.g., data packets containing messages or data), such as for example, 4G/5G cellular communications, Bluetooth, or the like. The communication module 132 may also transmit messages using a dedicated communication protocol, such as a dedicated short-range communication (DSRC), Cellular Vehicle-to-Everything (C-V2X), Vehicle-to-Infrastructure (V2I), Vehicle-to-People (V2P), or the like. The communication module 132 employs asymmetric encryption to secure received, transmitted on exchanged messages between the collision detection devices 108.

The collision event database 134 stores data related to registering the collision detection device 108, and collecting the incident report 124 sent by the collision detection device 108. The collision event database 134 stores a public key 138, a private key 140, the user record 136, the received incident report 124, the collision evidence report 126. The public key 138 is used for securely encrypting the collision evidence report 126 to be transmitted to a requesting collision detection device 108 or the user terminal 106. The private key 140 is kept confidential by the evidence collecting application 102 and is used to decrypt the received incident report 124 sent from the collision detection device 108.

The user terminal 106 is a human machine interface that is used by a user to register a specific collision detection device 108 with the evidence collecting application 102. The user terminal 106 may include a notebook computer, a desktop computer, a tablet terminal, a personal digital assistant, a smartphone, a wearable device such a glasses-type or wrist-watch-type information processing terminal, or the like. In one example, the user terminal 106 is integrated into a collision detection device 108. The user terminal 106 transmits data to the evidence collecting application 102 to register a respective collision detection device 108. The data is used to register the collision detection device as a member of the evidence collecting application. As a registered member, the collision detection device 108 is provided one or more granted permissions to exchange data communication with the evidence collecting application 102. The user terminal 106 allows the user to enter data related to one or more user preferences associated with the collision detection devices 108. The user terminal 106 receives an input, from the user, for a search criterion to request a search and retrieval for the collision evidence report 126. The search criterion includes a search query based on a temporal window associated with the collision event, a location of the collision event, and vehicle description data. The temporal window includes a date and time of associated with the collision event. The vehicle description data includes a vehicle make, a vehicle model, and a vehicle color. The vehicle description may also include a vehicle license plate number.

Figure 3:
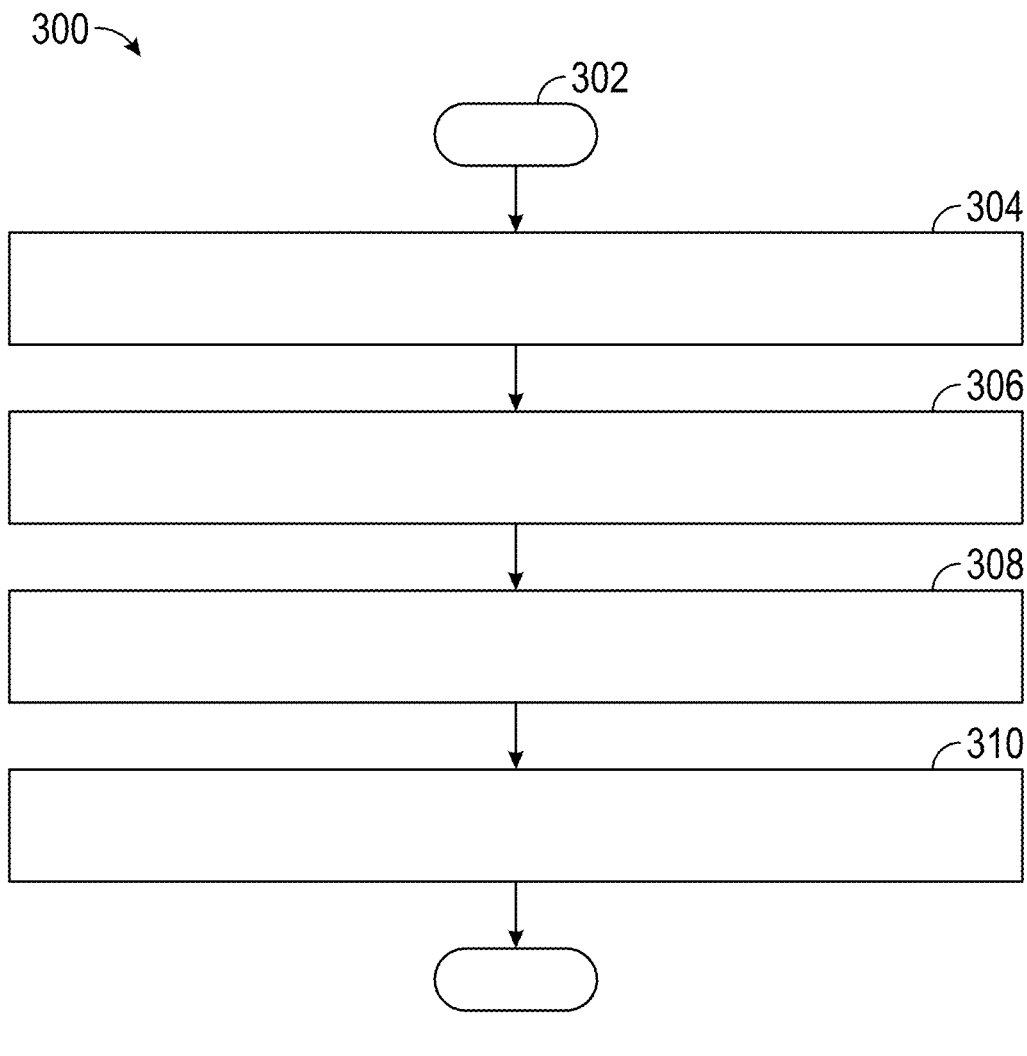
FIG. 3 is a flow chart illustrating an overview of a method implementing the application of FIG. 2.

Referring to FIG. 3, the evidence collecting application 102 utilizes an example method 300 for registering a collision detection device as a member with one or more granted permissions to communicate with the evidence collecting application 102. At step 302, the evidence collecting application 102 starts the method 300, and proceeds to step 304.

At step 304, the evidence collecting application 102 collects registration information, for a plurality of collision detection devices 108, to register each collision detection device of the plurality of collision detection devices as a member associated with the cloud-based application. The registration information is collected using the user terminal 106. Each member of the evidence collecting application 102 is granted permissions to exchange communications with the cloud-based application. After registering the plurality of collision detection devices, the evidence collecting application 102 proceeds to step 306.

At step 306, the evidence collecting application 102 sets a user preference, for each member, for automatically notifying a respective collision detection device in proximity with a collision event and a predetermined time of the temporal window associated with the nearby collision event detected and proceed to step 308. At step 308, the evidence collecting application 102 generates a user record for the registration information and the user preference associated for each collision detection device of the plurality of collision detection devices and proceeds to step 310. At step 310, the evidence collecting application 102 stores the user record in the collision event database and proceeds to END.

Figure 4:
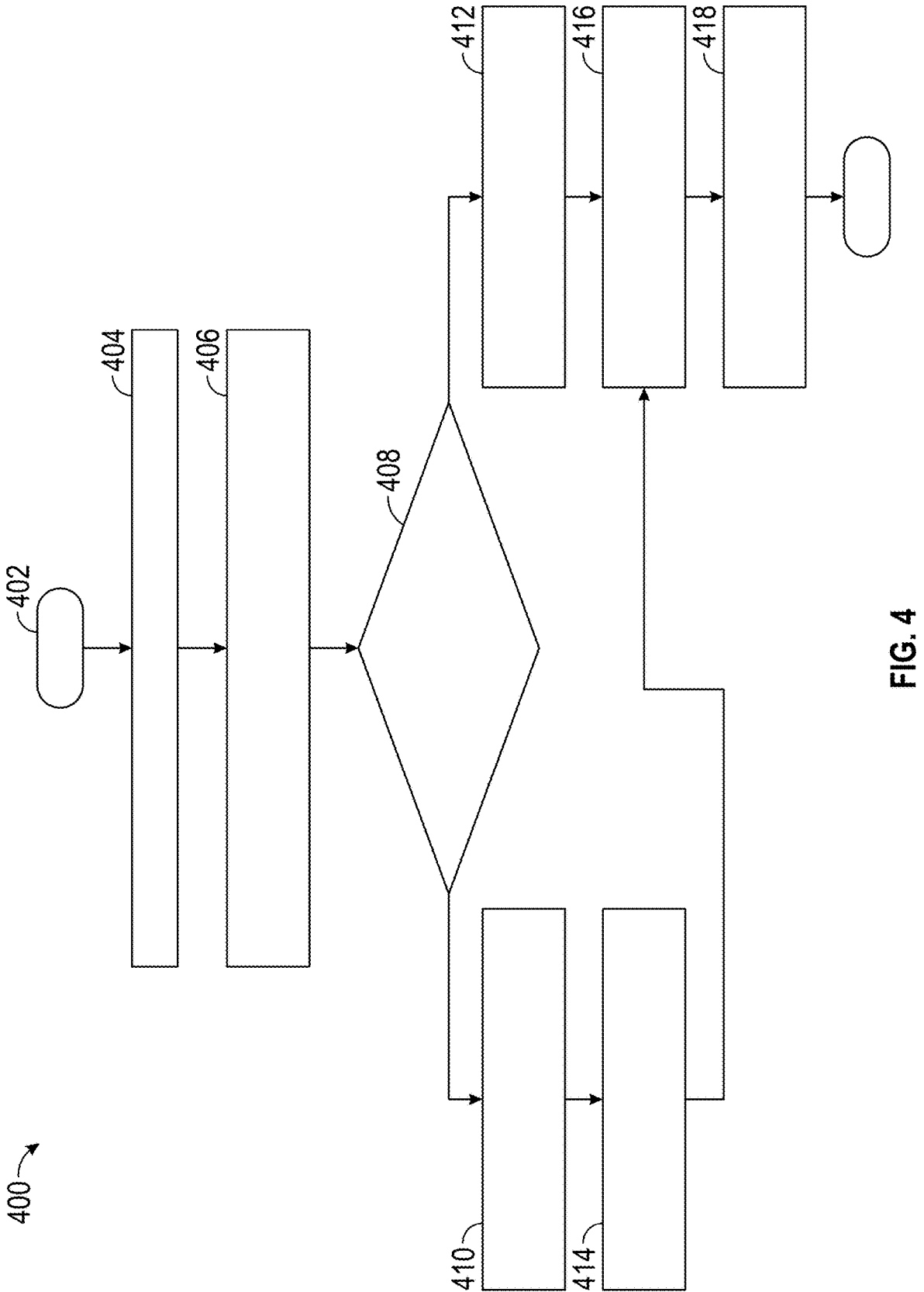
FIG. 4 is a flow chart illustrating a method for collecting, matching and reporting evidence related to collision events within a vehicular transportation system.

Referring to FIG. 4, the evidence collecting application 102 executed an exemplary method 400 for automatically searching and aggregating incident reports related to the same collision event detected. At step 402, the evidence collecting application 102 starts the method 400 and proceeds to step 404. At step 404, the evidence collecting application 102 establishes a communication link with a collision detection device, and proceeds to step 406. The evidence collecting application 102 receives a first incident report at step 406. The incident report includes a report generated based on collision information related to the collision event detected between the first vehicle 108-1 and the second vehicle 108-2 and vehicle insurance related data exchanged between the first and second vehicle or gathered from the first vehicle after the collision event was detected. The collision related information is generated based on sensed data detected within a temporal window of the collision event. The collision information includes a location of the collision event, a temporal window of the collision event, image data capturing the collision event between the first vehicle and the second vehicle, and may also include collision metric data. The vehicle insurance related data includes driver license information, insurance policy record related, and vehicle registration information related to at least one driver of the first vehicle and/or the second vehicle. After receiving the incident report, the evidence collecting application 102 proceeds to step 408.

At step 408, the evidence collecting application 102 determines whether the incident report received is related to another previously stored incident report. For example, evidence collecting application 102 determines "YES," the evidence collecting application proceeds to step 410. At step 410, the evidence collecting application 102 compiles the received incident report to the previously stored incident report and proceeds to step 412. At step 414, the evidence collecting application 102 generates a collision evidence report based on the received incident report and the previously stored incident report and proceeds to step 416. From step 408, the evidence collecting application 102 may also store the evidence report as the collision evidence report if "NO" is determined and proceed to step 416.

At step 416, the evidence collecting application 102 broadcasts a notification, to registered members associated with the evidence collecting application 102, to notify the registered members of collision event within a vicinity of their respective collision detection device and proceeds to step 418. The notification includes a user request input to determine whether to transmit the image data associated with the collision evidence report to a requesting collision detection device. At 418, the evidence collecting application 102 transmits to a requesting collision detection device, the image data related to the collision evidence report based on the user request input and proceeds to END.

Figure 5:
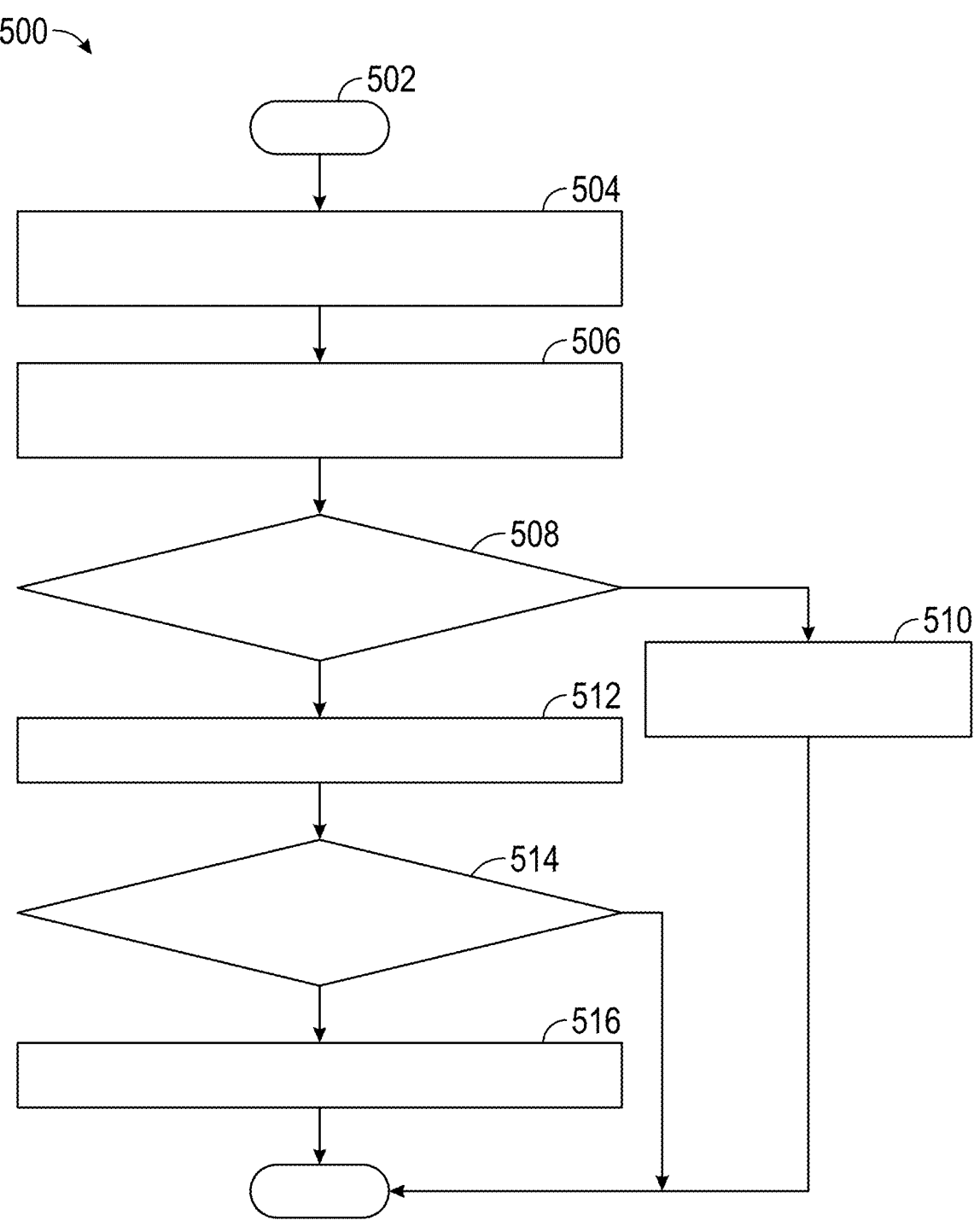
FIG. 5 is a flow chart illustrating a method for searching, matching and reporting evidence related to collision events within a vehicular transportation system.

Referring to FIG. 5, the evidence collecting application 102 utilizes an exemplary method 500 for automatically searching and aggregating incident reports related to the same collision event detected. At step 502, the evidence collecting application 102 starts the method 500 and proceeds to step 504. At step 504, the evidence collecting application 102 establishes a communication link with at least one of a user terminal or a registered collision detection device and proceeds to step 506. At step 506, the evidence collecting application 102 receives a request, from the user terminal or a registered collision detection device, to a search for a collision incident report based on an inputted search criteria and proceeds to step 508. The input search criteria may specify data defining related to a given collision event including a temporal window and a location related to the specific collision event. At step 508, the evidence collecting application 102 determines whether search results have been found. If no search results are found, the evidence collecting application 102 proceeds to step 510. At step 510, the evidence collecting application 102 transmits a notification indicating that no search results were found and proceeds to END.

If the search matches a previously stored incident report(s) to the search criteria, the evidence collecting application 102 proceeds to step 512. At step 512, the evidence collecting application 102 transmits a notification search results to the user terminal or the registered collision detection device and proceeds to step 514. The search results include a list of matches to the requested search criterion based of a percentage of a number of matching criteria associated with the collision evidence report.

At step 514, the evidence collecting application 102 determines whether to transmit a selected collision evidence report based on a user prompted input associated with the notification of the search results. If yes, the evidence collecting application 102 proceeds to step 516. At step 516, the evidence collecting application 102 transmits the collision evidence report to the user terminal or the registered collision detection device and proceeds to END.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for collecting, matching and reporting evidence related to a collision event involving a vehicle and an object captured on a first collision detection device associated with a vehicular transportation system, the method comprising:

establishing, using a processor, a communication link between a cloud-based application and the first collision detection device, wherein the first collision detection device is registered with the cloud-based application;

receiving, using the processor, a first incident report of a first collision event communicated from the first collision detection device to the cloud-based application, wherein the first incident report includes a first identification of the first collision event and first image data, first location data, first temporal data and first descriptive data of each involved vehicle of the first collision event;

searching a collision event database of the cloud-based application having a plurality of stored incident reports to locate a second incident report that corresponds with the first collision event based on receiving the first incident report, wherein each of the plurality of stored incident reports includes image data, location data, and temporal data of a recorded collision event, wherein the second incident report includes a second identification of a second collision event and second image data, second location data, second temporal data, and second descriptive data of each involved vehicle of the second collision event;

determining whether the first collision event of the first incident report matches the second collision event of the second incident report based on searching the collision event database;

compiling the first incident report with the second incident report when the collision event of the first incident report matches the second collision event of the second incident report; and generating a collision evidence report based on the compiled first and second incident reports, wherein the collision evidence report is associated with a complied collision event based on the first collision event and the second collision event.

2. The method of claim 1 further comprising, processing the collision evidence report to determine a location and a temporal window of the collision event;

analyzing the image data of the collision evidence report to determine whether the image data includes metadata identifying the location and the temporal window of the collision event;

processing the image data to include the metadata identifying the location and temporal window of the collision event to create an updated image data; and storing the collision evidence report having the updated image data.

3. The method of claim 1, wherein the first incident report is received from a vehicle involved in the first collision event.

4. The method of claim 1, wherein the first incident report is received from an observing device in proximity to the first collision event and wherein the observing device is one of at least a vehicle device or an infrastructure device.

5. The method of claim 1 further comprising:

processing the collision evidence report to identify each involved vehicle in the collision event;

searching the cloud-based application to determine whether any of the involved vehicles is registered for communication therewith;

establishing the communication link with the involved vehicles that are registered for communication with the cloud-based application; and transmitting the collision evidence report to at least one of the involved vehicles.

6. The method of claim 1 further comprising:

receiving a search query for the collision evidence report from a user on the cloud-based application, wherein the search query includes a geographic location and a temporal window;

searching the collision event database for identifying the complied collision event based on the search query; and transmitting the collision evidence report to the user.

7. The method of claim 6 further comprising:

processing the collision evidence report to identify any involved vehicles of the complied collision event;

determining whether the user is associated with any of the involved vehicles of the complied collision event;

determining whether to restrict access to the collision evidence report based on whether the user is associated with one of the involved vehicles of the compiled collision event; and providing access to the collision evidence report to the user when the user is associated with one of the involved vehicles of the complied collision event.

8. The method of claim 6 further comprising:

processing the collision evidence report to determine a location and a temporal window of the collision event;

determining whether a location of a user device associated with the user was located in a predetermined range of the temporal window and the location of the collision event based on a trip history of the user device;

determining whether to restrict access to the collision evidence report based on whether the location of the user device was the predetermined range of the temporal window and the location of the collision event; and providing access to the collision evidence report to a registered user when the user device was within the predetermined range and the temporal window of the collision event.

9. The method of claim 1 further comprising:

registering a user having a user device with the cloud-based application;

granting a permission right to the user for communicating with the cloud-based application via the user device, wherein the cloud-based application receives time and location data of the user device;

setting a user preference to push notifications from the cloud-based application to the user based, wherein the user preference includes a predetermined location range and a device time window for pushing notifications; and generating a registration record for the user including an identification of the user and the user device, the permission right and the user preference.

10. The method of claim 9 further comprising:

processing the first incident report to determine a collision time and a collision location for the collision event;

locating the user device based on the time and location data received therefrom; and transmitting a notification for the collision event when the user device is proximate to the collision event based on the predetermined location range and the device time window.

11. A cloud-based application system for collecting, matching and reporting evidence related to collision events within a vehicular transportation system, the cloud-based application system comprising:

a first collision detection device configured to:

capture a first collision event as first image data between an involved vehicle and a first object;

detect the first collision event based on the first image data; and form a first incident report based on detecting the first collision event and the image data; and a remote server external to the first collision detection device and in communication with the first collision detection device and configured to operate a cloud-based application, the remote server comprises:

a collision event database configured to store a plurality of incident reports, wherein each incident report is associated with a recorded collision event that occurred between a vehicle and an object and includes image data, location data, and temporal data of the recorded collision event;

a communication module in communication with the collision event database and configured to establish a communication link between the cloud-based application and the first collision detection device, wherein the first collision detection device is registered with the cloud-based application for communication therewith;

an evidence matching module comprises of:

a memory having stored programming instructions; and a processor electrically coupled to the memory, wherein the processor executing the programming instructions is configured to:

receive the first incident report of the first collision event communicated from the first collision detection device to the remote server, wherein the first incident report includes a first identification of the first collision event, and the image data capturing the first collision event, first location data, first temporal data, and first descriptive data of each involved vehicle of the first collision event;

search the collision event database to locate a second incident report that corresponds with the first collision event based on receiving the first incident report, wherein the second incident report is received from a second collision detection device, wherein the second incident report includes a second identification for a second collision event, and second image data, second location data, second temporal data for the second collision event;

determine whether the first collision event of the first incident report matches to the second collision event of the second incident report;

compile the first incident report with the second incident report when the first collision event of the first incident report matches the second collision event of the second incident report; and generate a collision evidence report based on the compiled first and second incident reports, wherein the collision evidence report is associated with a complied collision event based on the first collision event and the second collision event.

12. The cloud-based application system of claim 11, wherein the processor executing the programming instructions is further configured to:

process the collision evidence report to determine a location and a temporal window of the complied collision event;

analyze the image data of the collision evidence report to determine whether the image data includes metadata identifying the location and the temporal window of the complied collision event;

process the image data to include the metadata identifying the location and temporal window of the complied collision event to create an updated image data; and store the collision evidence report having the updated image data.

13. The cloud-based application system of claim 11, wherein the communication module is further configured to receive the first incident report from a device involved in the first collision event.

14. The cloud-based application system of claim 11, wherein the communication module is further configured to receive the first incident report from an observing device in proximity to the first collision event and wherein the observing device is at least one of the vehicle in proximity to the first collision event or an infrastructure device associated with the vehicular transportation system.

15. The cloud-based application system of claim 11, wherein the processor executing the programming instructions is further configured to:

process the collision evidence report to identify any involved vehicles in the complied collision event;

search the cloud-based application to determine whether any of the involved vehicles is registered for communication therewith;

establish the communication link with any of the involved vehicles when registered for communication with the cloud-based application; and transmit the collision evidence report to the vehicle.

16. The cloud-based application system of claim 11, wherein the processor executing the programming instructions is further configured to:

receive a search query from a user on the cloud-based application, wherein the search query includes a geographic location and a temporal window;

search the collision event database for identifying the complied collision event based on the search query; and transmit the collision evidence report to the user.

17. The cloud-based application system of claim 16, wherein the processor executing the programming instructions is further configured to:

process the collision evidence report to identify one of the involved vehicles in the complied collision event;

determine whether the user is associated with one of the involved vehicles involved in the complied collision event;

determine whether to restrict access to the collision evidence report based on whether a registered user is associated with one of the involved vehicles in the complied collision event; and provide access to the collision evidence report to the user when the registered user is associated with one of the involved vehicles in the complied collision event.

18. The cloud-based application system of claim 17, wherein the processor executing the programming instructions is further configured to:

process the collision evidence report to determine a location and a temporal window of the complied collision event;

determine whether a location of a user device associated with the user was located in a predetermined range of the temporal window and the location of the complied collision event based on a trip history of the user device;

determine whether to restrict access to the collision evidence report based on whether the location of the user device was the predetermined range of the temporal window and the location of the complied collision event; and providing access to the collision evidence report to the registered user when the user device was within the predetermined range and the temporal window of the complied collision event.

19. The cloud-based application system of claim 11, wherein the processor executing the programming instructions is further configured to:

register a user having a user device with the cloud-based application;

grant a permission right to the user for communicating with the cloud-based application via the user device, wherein the cloud-based application receives time and location data of the user device;

set a user preference to push notifications from the cloud-based application to the user based, wherein the user preference includes a predetermined location range and a device time window for pushing notifications; and generate a registration record for the user including an identification of the user and the user device, the permission right and the user preference.

20. A method for collecting, matching and reporting evidence related to a collision event involving at least one vehicle captured on a first collision detection device associated with a vehicular transportation system, the method comprising:

registering, using a processor, a user having a user device with a cloud-based application;

granting, using the processor, a permission right to the user for communicating with the cloud-based application via the user device, wherein the cloud-based application receives location and time data of the user device, and wherein the location and time data of the user device will from herein be referred to as a device location and a device temporal window;

setting, using the processor, a user preference to push notifications from the cloud-based application to the user, wherein the user preference includes a predetermined location range and a device time window for pushing notifications;

generating, using the processor, a registration record for the user including an identification of the user and the user device, the permission right and the user preference;

capturing, using the first collision detection device, a first collision event as first image data involving the at least one vehicle;

detecting, using the first collision detection device, the first collision event based on the first image data to form a first incident report, wherein the first incident report includes a first identification of the first collision event and the first image data, first location data, first temporal data and first descriptive data of each involved vehicle of the first collision event;

establishing, using the processor, a communication link between the cloud-based application and the first collision detection device, wherein the first collision detection device is a registered vehicle with the cloud-based application for communication therewith;

receiving, using the processor, the first incident report of the first collision event communicated from the first collision detection device to the cloud-based application;

processing the first incident report to determine a collision time and a collision location for the first collision event;

locating the user device registered with the cloud-based application based on the time and location data of the first collision event and the predetermined location range and the time window associated with the user device;

transmit a notification for the first collision event when the user device is proximate to the first collision event based on the predetermined location range and the device time window searching a collision event database of the cloud-based application having a plurality of stored incident reports to locate a second incident report that corresponds with the first collision event based on receiving the first incident report, wherein each of the plurality of stored incident reports includes image data, location data, and temporal data of a recorded collision event, and wherein the second incident report includes a second identification of a second collision event and second image data, second location data, second temporal data and second descriptive data of each involved vehicle of the second collision event;

determining whether the first collision event of the first incident report matches the second collision event of the second incident report based on searching the collision event database;

compiling the first incident report with the second incident report when the collision event of the first incident report matches the second collision event of the second incident report;

generating a collision evidence report based on the compiled first and second incident reports, wherein the collision evidence report is associated with a complied collision event based on the first collision event and the second collision event;

receiving a search query for the collision evidence report from a user on the cloud-based application, wherein the search query includes a geographic location and a temporal window associated with a third collision event;

searching the collision event database to compare the search query to the collision evidence report to determine whether the third collision event matches the complied collision event based on receiving the search query;

processing the collision evidence report to identify any involved vehicles associated with collision evident report based on the step of searching;

determining whether the user is associated with any of the involved vehicles;

determining whether to restrict access to the collision evidence report based on whether the user is associated with any of the involved vehicles;

determining whether a location of a user device associated with the user was located in the predetermined location range of the temporal window and the location of the complied collision event based on a trip history of the user device;

determining whether to restrict access to the collision evidence report based on whether the location of the user device was within a predetermined range of the temporal window and the location of the complied collision event;

providing access to the collision evidence report to the registered user when at least one of the following occurs: the user is associated with one of the involved vehicles in the complied collision event, the user device was within the predetermined location range and the temporal window of the complied collision event or a combination thereof; and transmitting the collision evidence report to the user.

* * * * *